(12) United States Patent
Bird et al.

(10) Patent No.: US 7,099,863 B2
(45) Date of Patent: Aug. 29, 2006

(54) SYSTEM AND METHOD FOR CACHING DATABASE QUERY STATEMENTS

(75) Inventors: Paul M. Bird, Markham (CA); Michael J. Snowbell, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 10/425,164

(22) Filed: Apr. 29, 2003

(65) Prior Publication Data

US 2004/0205053 A1    Oct. 14, 2004

(30) Foreign Application Priority Data

Apr. 8, 2003    (CA)    .................................... 2425046

(51) Int. Cl.
G06F 7/00 (2006.01)
G06F 17/30 (2006.01)

(52) U.S. Cl. ............................................. 707/4; 707/3

(58) Field of Classification Search ................... 707/1, 707/2, 3, 6, 9, 4; 709/229
See application file for complete search history.

(56) References Cited

U.S. PATENT DOCUMENTS

| | | | |
|---|---|---|---|
| 5,261,102 A | 11/1993 | Hoffman | 395/700 |
| 5,897,634 A | 4/1999 | Attaluri et al. | 707/8 |
| 6,012,067 A | 1/2000 | Sarkar | 707/103 |
| 6,212,634 B1 | 4/2001 | Geer, Jr. et al. | 713/156 |
| 6,253,208 B1 * | 6/2001 | Wittgreffe et al. | 707/104.1 |
| 6,321,235 B1 | 11/2001 | Bird | 707/203 |
| 6,604,096 B1 * | 8/2003 | Couch et al. | 707/2 |
| 6,618,718 B1 * | 9/2003 | Couch | 707/2 |
| 2002/0073089 A1 | 6/2002 | Schwartz et al. | 707/10 |
| 2002/0078094 A1 | 6/2002 | Krishnaprasad et al. | 707/513 |
| 2002/0107835 A1 * | 8/2002 | Coram et al. | 707/1 |
| 2002/0123978 A1 | 9/2002 | Bird et al. | 707/1 |
| 2005/0203897 A1 * | 9/2005 | Kapitskaia et al. | 707/3 |

FOREIGN PATENT DOCUMENTS

JP    2000163448 A    4/2001

OTHER PUBLICATIONS

Sandhu, "Relational Database Access Controls", Handbook of Information Security Management (1994-95 Yearbook), Auerback Publishers, 1994, pp. 145-160.*
Keller et al., "A predicate-based caching scheme for client-server database architectures", The VDLB Journal (1996) 5, pp. 35-47; Springer-Verlag.*
Ren et al., "Semantic Caching and Query Processing", IEEE Transactions on Knowledge and Data Engineering, vol. 15, No. 1; Jan./Feb. 2003.*

(Continued)

Primary Examiner—Jeffrey Gaffin
Assistant Examiner—Michael J. Hicks
(74) Attorney, Agent, or Firm—Samuel A. Kassatly

(57) ABSTRACT

In a database system that supports object name overloading, database query statements are compiled and cached as data structures so that object level privileges are correctly resolved. Database query statements stored in the cached data structures are utilized when appropriate and a new compilation is performed when an incorrect resolution would result. The data structures are stored in a predefined order to ensure that a deterministic search of the cache is efficiently performed.

36 Claims, 6 Drawing Sheets

OTHER PUBLICATIONS

Luo et al., "Active Query Caching for Database Web Servers", WebDB 2000, LNCS 1997, pp. 92-104; 2001; Springer-Verlag Berlin Heidelberg.*

Lou Anna Noatargiacomo, "Role-Based Access Control in ORACLE7 and Trusted ORACLE7," ACM RBAC Workshop, MD, USA 1996.

H. M. Gladney, "Access Control for Large Collections," ACM Transactions on Information Systems, vol. 15, No. 2, Apr. 1997, pp. 154-194.

"Determining Database Object Authorization," IBM Technical Disclosure Bulletin vol. 32, No. 9B. Feb. 1990.

* cited by examiner

SYSTEM AND METHOD FOR CACHING DATABASE QUERY STATEMENTS

PRIORITY CLAIM

The present application claims the priority of Canadian patent application, Serial No. 2,425,046, titled "Method of Compiling and Caching Database Query Statements Having Overloadable Object Types That Inclulde Privilege Restrictions," which was filed on Apr. 8, 2003, with the Canadian Patent Office, by Paul M. Bird and Michael J. Snowbell, and which is incorporated herein by reference.

FIELD OF THE INVENTION

The present invention generally relates to database management systems. More specifically, the present invention relates to a system and associated method for caching of database query statements.

BACKGROUND OF THE INVENTION

Database queries are statements used for directing a database management system (DBMS) to manage (access, store, sort, etc) data stored in a database. An example of a known and popular type of database query is an SQL (Structured Query Language) query that is a type of database query. SQL conforms to a specific or defined database access language commonly used to access relational databases. In a typical use of a relational database, many clients may issue SQL statements to a relational database management system (RDBMS) that in turn compiles the query and executes the compiled query against the relational database. Clients are applications that are written by users to operate on a specific data processing system and interact with the database that is network connected to the specific data processing system. The client may be referred to as the application and that these two terms may be used throughout this document to mean the same entity.

To execute an SQL query statement, the RDBMS must process (that is, compile) the SQL statement issued by the client by parsing the SQL query statement and translating a high level access represented in the statement into an access plan. The access plan is an executable set of instructions that accesses (generally manages) the underlying representation of the objects which are stored in the relational database. This processing of the SQL query statement, referred to as 'compiling', may also involve advanced techniques of optimization to choose an optimal access plan. This optimal access plan enables improved execution time when the RDBMS executes the SQL query statement against the relational database, providing improved database performance for the client.

'Dynamic SQL' is a type of SQL query statement issued by the client that is not compiled until the client issues a database query. Dynamic SQL query statement is often used for ad hoc database queries. For example, in a database used to track sales of individual products a dynamic SQL query may be invoked by the client in which the dynamic SQL query requests a list of the top ten products sold by sales region from the RDBMS. Depending upon a nature of the dynamic SQL query and on the characteristics of the underlying objects stored in the relational database, the time required to compile this query can be significantly high and thus is a major drawback that reduces database responsiveness as perceived by the client.

Furthermore, if an identical dynamic SQL query is issued later by the client or by another client, the previously generated access plan has to be regenerated each time the RDBMS receives the same dynamic SQL query. Given the potentially high cost of compilation incurred by the RBMDS, this arrangement presents another significant drawback.

To address these issues, relational database management systems, for example DB2 (a product sold by IBM Ltd.), have introduced 'dynamic SQL caches' in which previously issued SQL query statements and their compiled access plans are maintained in an 'in-memory' cache. In-memory cache is a cache or some sort of memory (persistent or not persistent, such as RAM, hard drive, floppy drive, etc). The use of in-memory cache allows recall of the previously generated and used access plans at a later time. When the client issues a new SQL query statement to the RDBMS, the SQL cache is accessed by the RDBMS. If the RDBMS identifies that the newly received SQL query statement is found in this cache, the entire compilation process can be skipped since the corresponding access plan is available in memory and is ready for execution by the RDBMS, thereby reducing the amount of overall time required to process the new SQL query statement.

In the case of DB2, the SQL cache is accessible by all clients that are accessing (or are 'connected to') a particular database (via the RDBMS), so that any SQL statement may be compiled once on behalf of one client by the RDBMS. The cached access plan is then available for any use by other future clients to be executed by the RDBMS without compilation.

In RDBMSs, and in DB2 in particular, an access plan chosen during compilation is not solely a function of the input SQL query statement text. The compilation takes into account a number of client settings (including special register values) that can alter semantics of the SQL query statement or in some other way impact the compiled access plan. This set of client settings is known as the 'environment'. To ensure that the SQL cache correctly returns the access plan for any client issuing an SQL query, the lookup in the cache is based both on the SQL statement issued by the client and the environment (client settings).

FIG. 1 shows a basic logical structure of an example of a conventional SQL cache 100. A 'statement entry' 102 is a control block that comprises the statement text and is the parent control block for one or more 'environment entries' 104. The 'environment entry' 104 is a control block that comprises the 'environment' and is the parent control block for an access plan 106 to be executed and a list 108 of required privileges on objects referenced in the SQL statement. In this diagram and in subsequent diagrams the 'environment' is shown as a single field (e.g. E1 104) while representing a set of values comprising the environment.

RDBMSs may also be designed to allow a database administrator to restrict access to various database objects to specific users or groups of users. These restrictions are typically implemented as object privileges that are granted to users or groups of users. In order for an SQL statement to be executed, the RDBMS must first ensure that the user issuing the SQL statement possesses all required privileges on all objects referenced (directly or indirectly) by the statement.

An effective method for handling such object privileges (and one implemented in the DB2 product) is to store the list 108 of required object privileges together with the access plan 106 in the SQL cache 100. Upon finding a 'matching' SQL statement in the SQL cache 100 for a given request, the RDBMS processes the list 108 of required privileges that are stored together with the statement 102 and the access plan 106 in the SQL cache 100, The RDBMS then verifies that the user issuing the query possesses all required privileges.

If the user does possess the required privileges, the access plan 106 will be executed. Otherwise, an authorization error is returned to the application indicating that the user does not possess the appropriate privileges. In this manner, the compilation process need not concern itself with whether the user possesses the required privileges. Rather, the privilege check is a post-compilation check of the list of required privileges. Consequently, it is not necessary to repeat a compilation for each different user issuing the same SQL query. Only the required privileges must be checked each time there is an attempt to use a cached access plan.

Using this approach of keeping the privilege checking outside of the compilation process, the SQL and access plan caching is most effective as it can reduce compilations for any application and for any user issuing SQL statements.

Many RDBMSs also support certain object types that support name 'overloading' in an SQL statement. That is, a database query may have overloaded object types that the RDBMS may support. That is, there may be more than one object (of the same object type) that share the same object name. In this case, the RDBMS must 'resolve' the specific object from the context in which it is referenced in the SQL statement. In the DB2 product, functions, methods, and procedures are such objects, and thus for convenience the generic term 'routine' will be used to refer to any 'overloadable object' supported by a specific RDBMS.

Extensibility implies making the relational DBMS more object oriented and adding user-defined datatypes (UDTs), user-defined functions (UDFs), user-defined access methods, and usually changing an extensible optimizer. UDTs comprise complex datatypes that may encapsulate complex internal structures and attributes. UDFs define the methods by which applications can create, manipulate, and access the data stored in these new datatypes. Users and applications only call the UDFs and do not need to understand their internal structure. UDFs also support the notion of overloading, which refers to the concept of using the same name for different routines (actually called methods or member functions).

The user can define different UDFs with the same name, but each UDF is applicable to a specific UDT. For example, a function called sum( . . . ) applied to integer datatypes would perform conventional addition, while sum( . . . ) applied to spatial datatypes would perform vector addition. User-defined access methods define the techniques by which the UDTs are accessed and indexed. For instance, through user-defined access methods, R-trees for spatial datatypes can be implemented. An extensible optimizer provides ways to assign costs to UDFs and user-defined access methods, consequently, the DBMS can determine the best way to access the data stored in the UDTs.

A single SQL statement may comprise multiple routine references. When compiling such a statement, the compilation must correctly resolve each of the referenced 'routines' in the statement. These routines will be referenced as 'instances'. As is well known with the software concept of 'overloading', when there are many instances of the same name, depending on the context (most typically the routine arguments) some of the instances may not be applicable. Some of the others may be applicable, or 'qualifying' matches, but of these there are criteria that establish which is the 'best match' of the routine instances. The choice of this 'best match' is known as routine resolution.

If an RDBMS does not enforce user 'privileges' on routines, then routine resolution does not impact the caching methods of the prior art. If multiple users issue the same SQL statement, with the same environment settings, any routines referenced in the statement will always resolve to the same best match, regardless of which user compiles the query. Therefore, access plan caching can proceed as before.

Some relational database management systems (such as DB2 Version 8) enforce database privileges on routines. A user (or group of users) may or may not have the privilege to access (i.e. execute) the routine. In this case, when compiling an SQL statement that comprises a reference to one or more routines, the routine resolution that occurs during compilation must take into account the user's privileges. This may impact the resolution process in such a way that the 'best match' instance of the routine is not chosen in routine resolution because a user does not have the required privileges. In this case, a choice of a different 'qualifying' routine instance is made by sequentially checking if the user has the required privilege on the 'next best match' until an authorized match is found or no other routines remain (in which case an error will occur).

With this combination of routine-name overloading and routine privileges, the prior art for caching of dynamic SQL is inadequate for caching compiled SQL statements that comprise routine references. This can best be seen by a simple example. Consider two routines both of name F1; these will be referenced as F1.*a* and F1.*b*. Consider two users, user1 and user2; user1 is granted the privilege to execute F1.*b*, but not F1.*a*; user2 is granted the privilege to execute both F1.*a* and F1.*b*.

The prior art relies on the evaluation of whether a user held required privileges as a validation step that could be performed after compilation (resulting in a successful validation or an error being returned to the application).

In this example, user1 and user2 issue the identical query "SECECT F1(C1) from X.T1", both with the same environment. In this example it is assumed that (given the data type of the column C1) F1.*a* would be the best match, and F1.*b* is a qualifying match, but not the best match. For the sake of the example, assume that both users have all required privileges to select from X.T1.

If user1 issues the query first (when the cache is not yet populated for this statement), then as part of compilation the routine resolution attempts to resolve the F1(C1) reference to F1.*a*. However, since user1 is not authorized to execute F1.*a*, the routine resolution resolves to the 'next best' match F1.*b*. In this case, since user1 is authorized to execute F1.*b*, then F1.*b* will be chosen as the instance of F1 to use. An access plan will be generated that uses F1.*b*.

If this access plan is cached in the SQL cache using prior art methods, then the privilege required to execute F1.*b* cache is stored together with the access plan. If user2 subsequently issues the statement, the RDBMS will find a match in the cache, i.e. it will find a matching statement text and environment. The RDBMS will then evaluate that user2 is authorized to execute F1.*b*; consequently, user2 will execute the access plan generated from the compilation performed on behalf of user1. However, this results in an incorrect decision by the caching logic, since user2 is authorized to execute F1.*a*, which is the 'best match'. The caching logic should execute an access plan that reflects a routine resolution for F1(C1) that chooses F1.*a* but chooses F1.*b* instead.

Conversely if user2 issued the query first (when the cache is not yet populated for this statement), the compilation will drive a routine resolution that will select F1.*a*, as it is the best match and user2 is authorized to execute it. The access plan will be cached reflecting a selection of F1.*a* and the list of required privileges will comprise F1.*a*. If user1 then issues the same statement (with the same environment), a match in the cache will be found based on the statement text and the environment. However, when evaluating whether user1 has the required privileges, the RDBMS will determine that user1 does not have the privilege required to execute F1.*a*. Consequently, the RDBMS will return an error to the application, even though the request of user1 should not have failed. User1 should have been able to execute successfully by compiling the statement again and resolving to F1.*b*.

One way to correct this problem is to ensure that when routine resolution is processing a statement, one user is not permitted to be matched with another user's access plan in the cache. This is effectively the same as including a 'user identification' as part of the environment. The RDBMS would ensure that a cache lookup on behalf of user2 would not use an access plan stored on behalf of user1, and vice versa. However, this is clearly not an ideal solution. A database system may comprise many users; most of them might even possess the exact same routine privileges. In fact, in a given installation, access to all routines may be granted to PUBLIC (anyone). In that case, if user identification was comprised as part of the environment a separate compilation would result for each different user query. Each compilation would generate an identical access plan that would be cached under its own different environment. This is not an optimal use of space in the SQL cache and requires each user to incur the cost of the SQL statement compilation.

Accordingly, a solution that addresses, at least in part, this and other shortcomings is desired. The need for such a system has heretofore remained unsatisfied.

SUMMARY OF THE INVENTION

The present invention satisfies this need, and presents a system, a computer program product, and an associated method (collectively referred to herein as "the system" or "the present system") for improving the manner in which a DBMS selects access plans stored in a memory cache when the DBMS processes database query statements. The present invention also reduces the frequency of database query statement compilations while ensuring that access privileges are respected. The present invention improves the operation of the DBMS by choosing a previously compiled cached access plan if and only if a same access plan would have resulted from a new compilation.

It is another object of the invention to avoid increasing a size of the memory cache more than necessary by organizing information in the cache to reduce duplication.

In accordance with an aspect of the invention there is provided, for a database management system operatively connected to a memory cache, a method for directing the database management system to cache a database query statement into the memory cache, the database query statement belonging to a user that has been granted execute privileges to selected database access routines. This method comprises determining a best available match for each routine object reference in the database query statement by selecting a specific routine from among the routines considered as a match, adding the best available match to a list of better match routines if the user does not have execute privileges for the best available match, adding the best available match to a list of resolved-to routines if the user has execute privileges for the best available match, and storing the list of better match objects and the list of resolved-to objects as part of a data structure in the memory cache.

In accordance with a further aspect of the invention, there is provided a database management system operatively connected to a memory cache, the database management system for caching a database query statement into the memory cache, the database query statement belonging to a user that has been granted execute privileges to selected database access routines.

The database management system comprises determining means for determining a best available match for each routine object reference in the database query statement by selecting a specific routine from among the routines considered as a match, first adding means for adding the best available match to a list of better match routines if the user does not have execute privileges for the best available match, second adding means for adding the best available match to a list of resolved-to routines if the user has execute privileges for the best available match, and storing means for storing the list of better match objects and the list of resolved-to objects as part of a data structure in the memory cache.

In accordance with another aspect of the invention there is provided a computer program product having a computer-readable medium tangibly embodying computer executable code for directing a data processing system to implement a database management system operatively connected to a memory cache, the database management system for caching a database query statement into the memory cache, the database query statement belonging to a user that has been granted execute privileges to selected database access routines.

The computer program product comprises determining code for determining a best available match for each routine object reference in the database query statement by selecting a specific routine from among the routines considered as a match, first adding code for adding the best available match to a list of better match routines if the user does not have execute privileges for the best available match, second adding code for adding the best available match to a list of resolved-to routines if the user has execute privileges for the best available match, and storing code for storing the list of better match objects and the list of resolved-to objects as part of a data structure in the memory cache.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The invention provides a method, a data structure, a computer program product and a computer readable modulated carrier signal embedding means for effective and accurate caching when a user's privileges to routines are a factor in Dynamic Structured Query Language (SQL) routine resolution.

The method in accordance with a preferred embodiment is divided into two parts: a first part in which information is gathered during routine resolution during compilation of an SQL statement and cached together with the 'environment' information in the SQL cache; and, a second part in which privileges on specific routines are compared to the routine environment entries when a dynamic SQL is checked for a previously compiled access plan that matches the SQL statement.

The following detailed description of the embodiments of the present invention does not limit the implementation of the invention to any particular computer programming language. The present invention may be implemented in any computer programming language provided that the OS (Operating System) provides the facilities that may support the requirements of the present invention.

A preferred embodiment of the present invention can be implemented in the C or C++ computer programming language (or other computer programming languages in conjunction with C/C++). Any limitations presented would be a result of a particular type of operating system, computer programming language, or data processing system, and would not be a limitation of the present invention. The present invention includes a software programming code or computer program product that is typically embedded within, or installed on a computer. Alternatively, the present invention can be saved on a suitable storage medium such as a diskette, a CD, a hard drive, or like devices.

Part I. Statement Compilation

In order to identify the various instances of the same routine name, each routine instance is identified by a 'specific name'.

Inputs to the method comprise the statement text and a user identification (userid). The statement text may comprise more than one routine reference; each routine reference is identified by a positioned index within the statement (from 1 to N, where N is the number of routine references in the statement). An individual routine name may appear multiple times in the statement, but need not resolve to the same routine instance each time.

Figure 1:
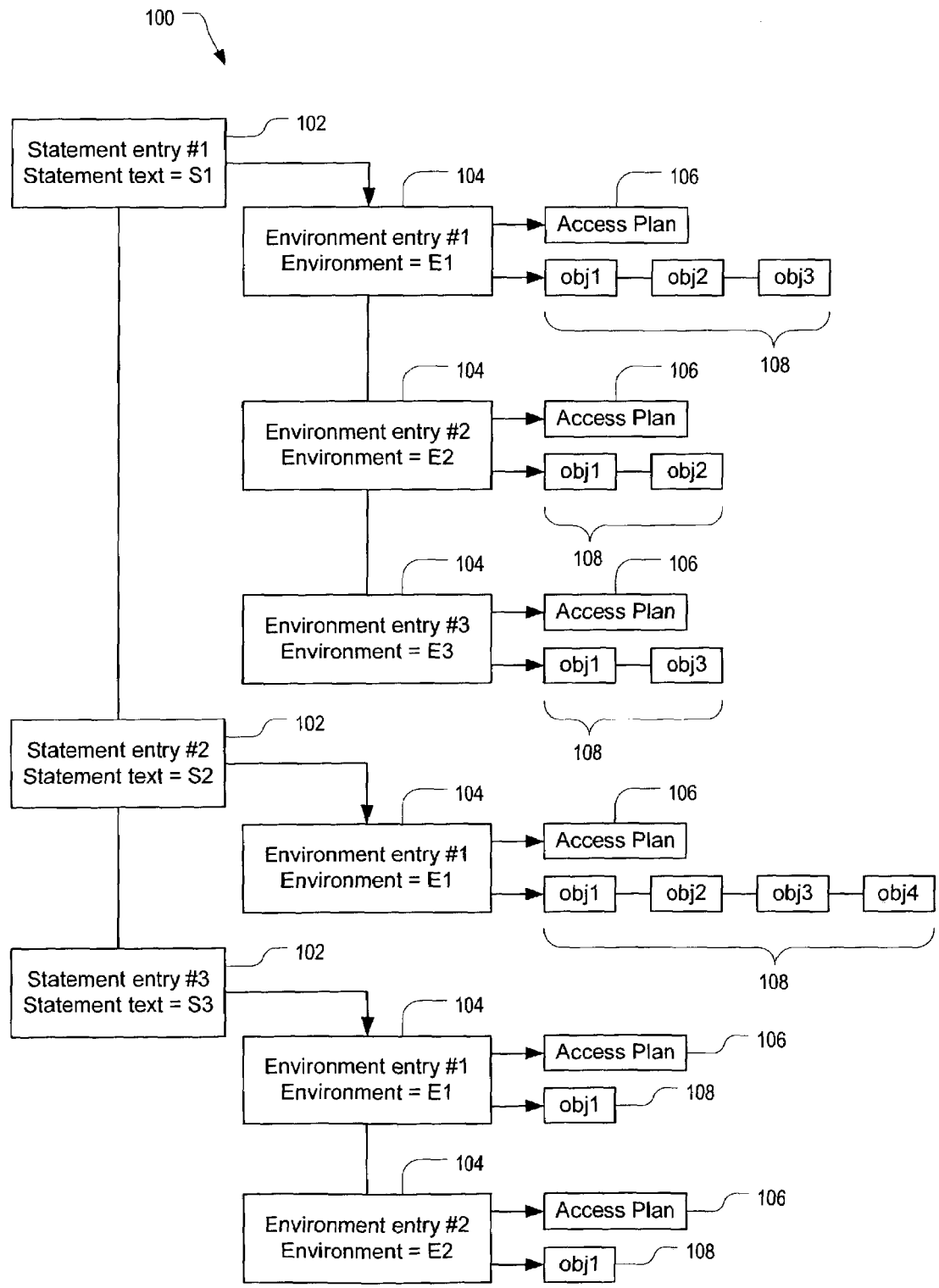
FIG. 1 is a block diagram of a conventional dynamic SQL cache.
Figure 2A:
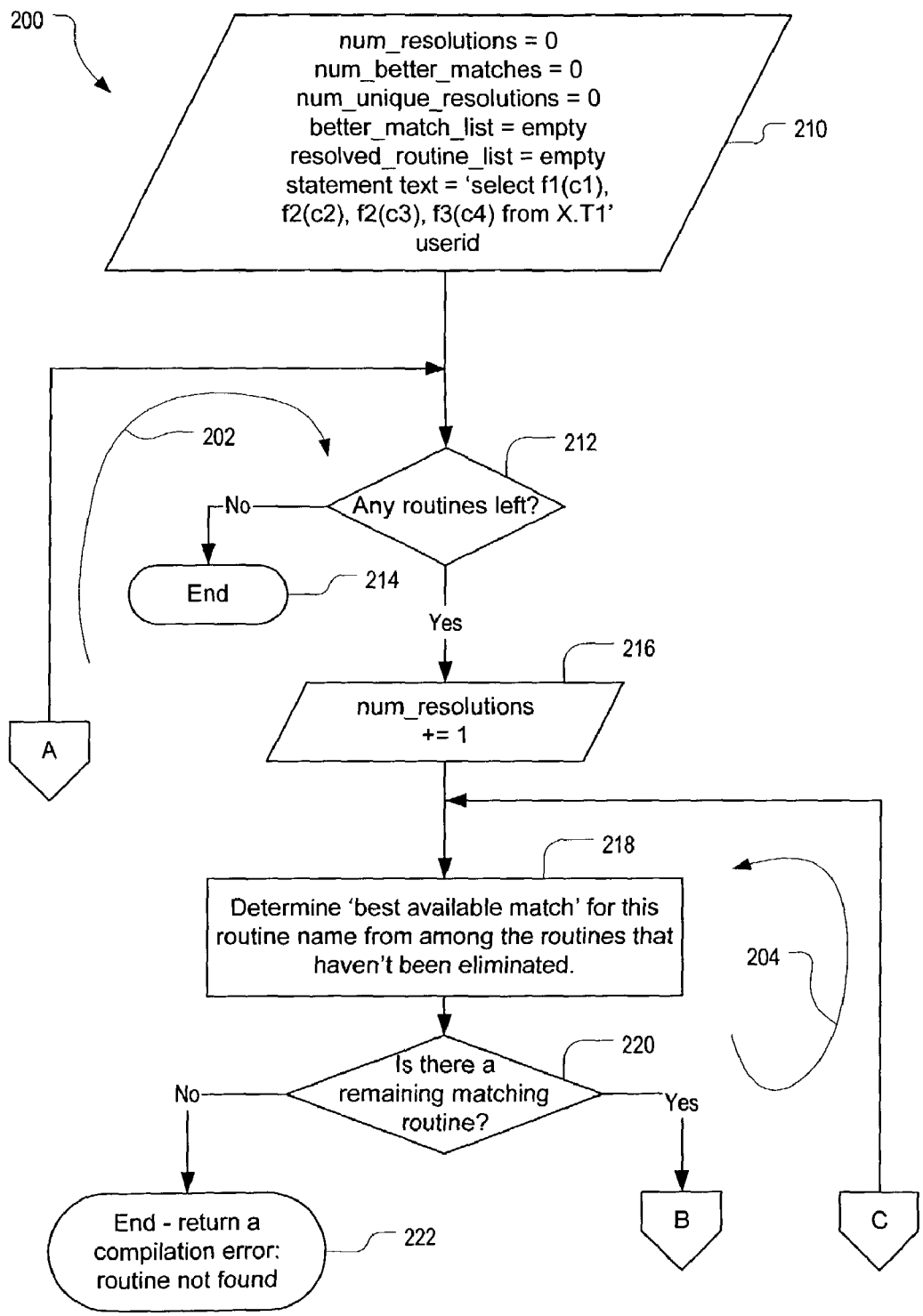
FIG. 2 is comprised of FIGS. 2*a* and 2*b*, and represents a flowchart depicting a method for compiling a dynamic SQL statement in accordance with the invention.
Figure 2B:
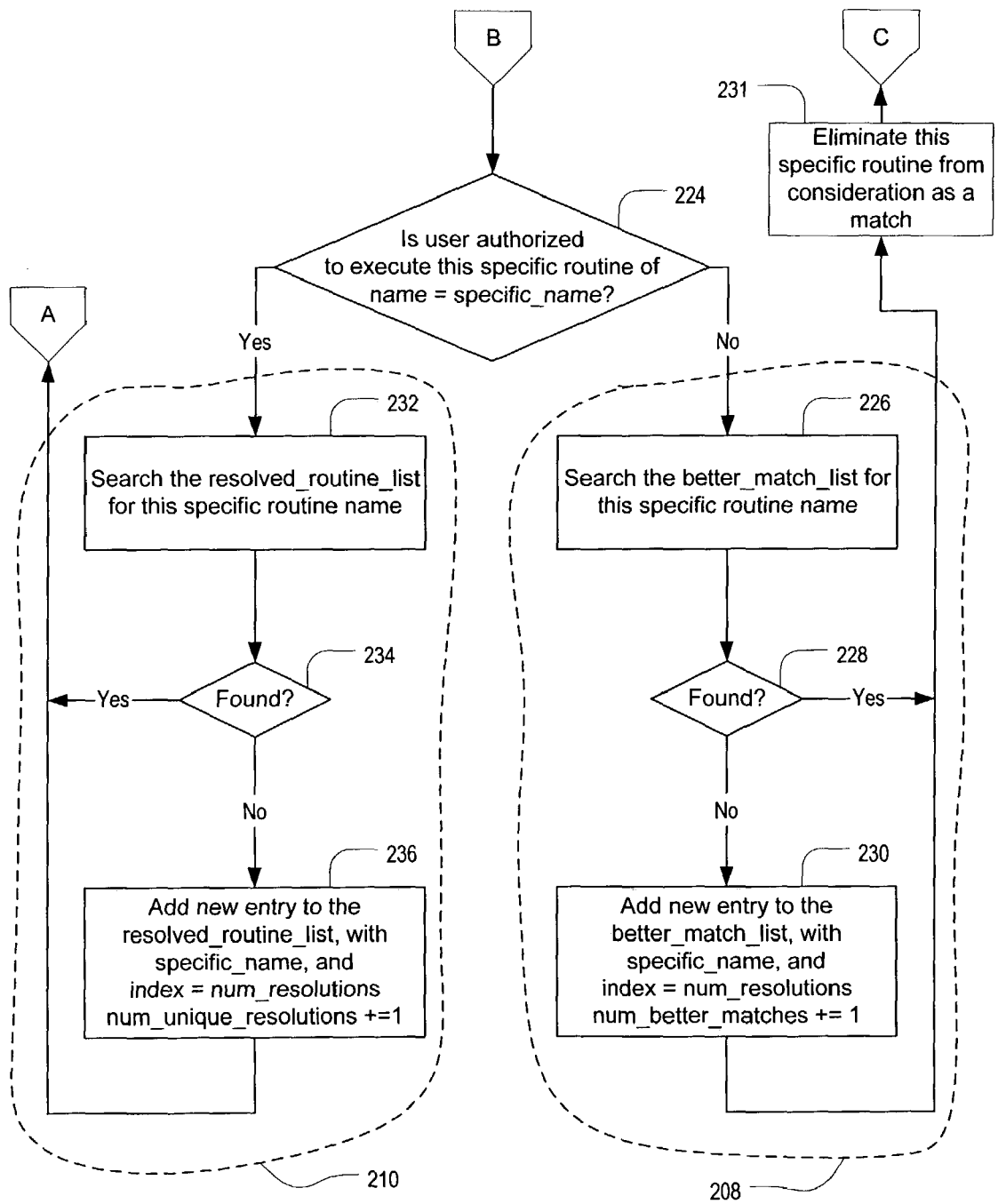

A method of operation 200 of the present invention is shown in the flow chart of FIG. 2 (FIGS. 2a and 2b). Method 200 illustrates the processing that occurs during a compilation process in which an SQL statement may have multiple routine references, each of which is resolved separately. In general, an outer loop 202 sequentially processes each routine reference in the statement text. A 'best available match' for this routine name is determined from among the specific routines that haven't been eliminated (step 218).

A second loop 204 processes the 'best available matches'. If the user is not authorized to execute a specific routine then the routine is added to the better match list 308, if it is not already in the list (see FIG. 2b, section 208 of the flowchart). The specific routine is then eliminated from consideration as a match (step 231). If the user is authorized to execute this specific routine then it is added to a 'resolved routine list 310' if it is not already there (see FIG. 2b, section 210 of the flowchart) and the second loop 204 is terminated. The outer loop 202 is terminated when there are no more routine references in the statement text to process.

In detail, several variables are initialized (step 210):
num_resolutions (for counting a number of routine references in the statement) is set to zero;
num_better_matches (for counting a number of routines that are better matches but for which the user does not have permission) is set to zero;
num_unique_resolutions (for counting a number of unique routines resolved) is set to zero;
better_match_list (a list of routines that are better matches than the resolved routines in which each list entry identifies the specific routine name for the better match in addition to a positional index indicating by which routine resolution in the statement the better matching routine was first encountered) is set to empty; and,
resolved_routine_list (a list of the resolved routines in which each list entry identifies the specific routine name for the resolved routine in addition to a positional index indicating which routine resolution in the statement the resolved routine was first encountered) is set to empty.

The statement text in this example is 'select f1(c1), f2(c2), f1(c2), f3(c4) from X.T1'. The userid is also required for the purpose of checking privileges. Each routine reference in the statement text is sequentially processed. If there are no routines left (step 212) then the compilation is terminated (step 214). Otherwise, the number of resolutions (num_resolutions) is incremented (step 216).

Next, a 'best available match' far a current routine name is determined from among all potentially matching routines that have not been eliminated (step 218). The list of specific routines is processed until one is found that the user has permission to execute. If a specific routine is not found (step 220), a compilation error is returned (step 222). Otherwise, method 200 proceeds to FIG. 2b. If the user is not authorized to execute a specific routine (step 224) then the better match list 308 is searched far the specific routine (step 226). If it is found (step 228). the specific routine is eliminated from consideration as a match because the user is not authorized to execute it (step 231).

The compilation returns to step 218 and the next routine is processed, repeating steps 218, 220, 224, 226, and 228. If it is not found, the specific routine is added to the better match list 308, the positional index associated with that entry is set to be the equal to a current value of num_resolutions (step 230), and the better matches counter is incremented before the compilation returns to the next specific routine (step 218).

When a specific routine is found that the user has permission to execute (step 224), the resolved routine list 310 is searched for that specific routine (step 232). If it is found (step 234) then the next routine in the SQL statement is processed (go to step 212 via the outer loop 202). If it is not found then a new entry is added to the resolved routine list 310 and the positional index associated with that entry is set to be the equal to the current value of num_resolutions (step 236). The number of unique resolutions is updated before the next routine in the SQL statement is processed in step 212.

Figure 3:
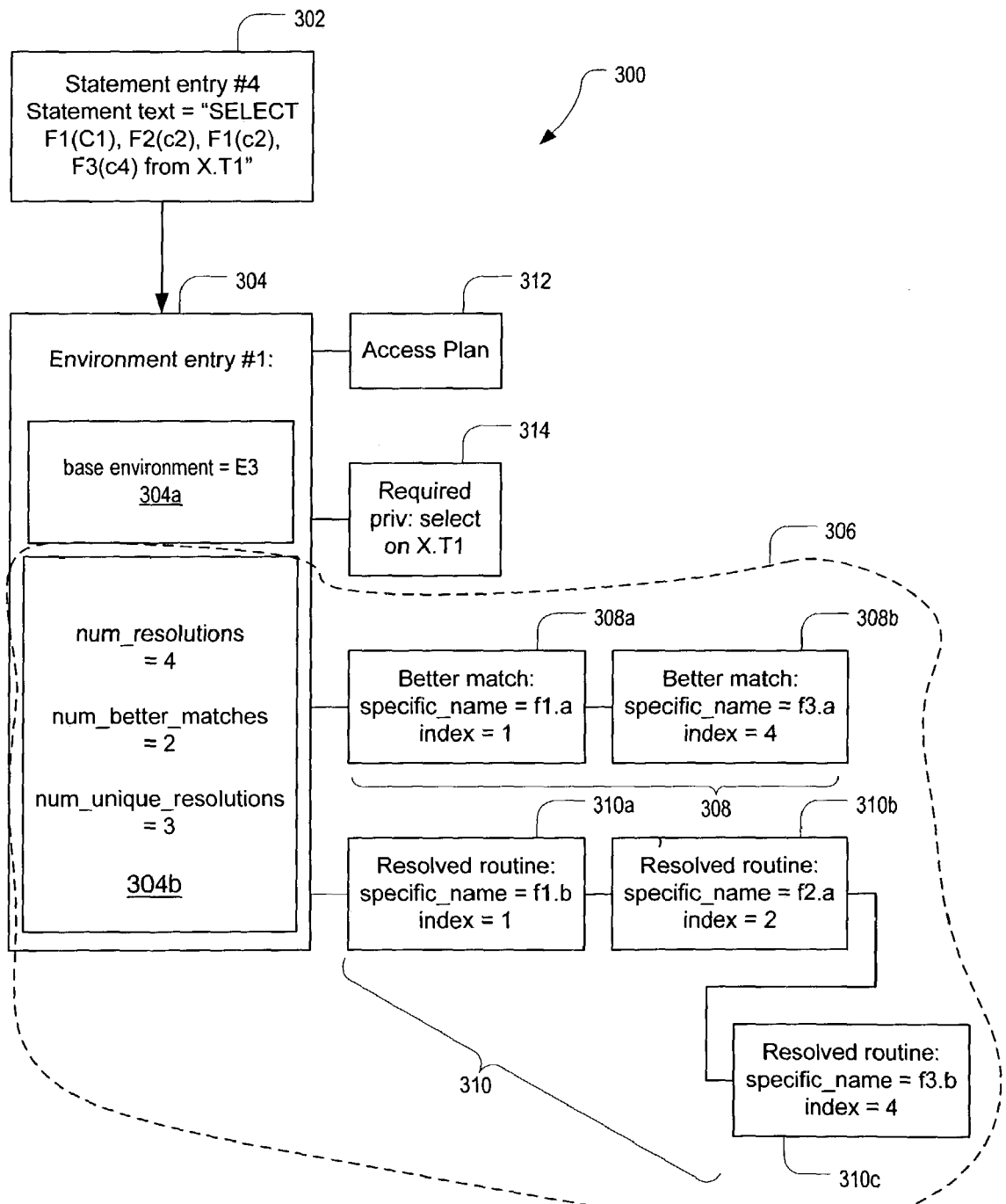
FIG. 3 is an exemplary environment entry resulting from an application of the method depicted by the flowchart shown in FIG. 2.

FIG. 3 is a data structure that comprises an environment entry and associated structures that is stored in the cache after compiling the example statement text: 'select f1(c1), f2(c2), f1(c2), f3(c4) from X.T1' on behalf of a userid with certain privileges on the candidate f1,f2,f3 and f4 functions 302. An environment entry 304 comprises a base environment 304a (E3, which comprises environment settings known in the art) and a 'routine environment' 306. The routine environment 306 comprises output from the compiler associated with the routine resolution that is maintained in and parented by the environment entry. The routine environment 306 comprises:

the number of resolutions (num_resolutions, in the example it is=4, the total number of routine references in the statement), the number of better matches (num_better_matches, in the example it is=2, the total number of unique specific routines that would have been chosen as better matches if the user had been authorized to execute them), and the number of unique matches (num_unique_resolutions, in the example it is=3, the total number of unique specific routines that were chosen by function resolution).

The routine environment 306 also comprises information that identifies the specific resolved routines, and/or a 'better-matching' routine that could not be included in the resolved routines because of a lack of execute privilege. That is the routine environment comprises a 'better match list' 308a, b, that is a list of routine_info structures that identify the specific routines that would have been selected as better matches if the user were authorized to execute them. For each of those entries, the resolution_index element indicates a routine reference with which the specific routine is associated. The number of elements in this list is num_better_matches.

The 'routine environment' also comprises a 'resolved routine list' 310a, b, c, that is a list of routine_info structures that identify the specific routines that were selected during routine resolution. The resolution_index element of each of these entries indicates a routine reference with which the specific routine is associated. The number of elements in this list is specified by the num_unique_resolutions. The user on behalf of whom the compile was executed is authorized to execute each of the routines in this list. Each routine_info structure 308a, 308b, 310a, 310b, 310c comprises the specific name and the resolution_index that is a positioned index.

In this example, the following specific routines that share the same name exist:

Routine name f1( ): specific names f1.a, f1.b, f2.c;
Routine name f2( ): specific names f2.a, f2.b; and
Routine name f3( ): specific names f3.a, f3.b.

The ordering of match 'quality' from best to worst:

For f1(c1) (resolution #1): f1.a is the best match followed by f1.b and f1.c;

For f2(c2) (resolution #2): f2.a is the best match followed by f2.b;

For f1(c2) (resolution #3): f1.a is the best match followed by f2.b and f1.c; and For f3(c4) (resolution #4): f3.a is the best match followed by f3.b In this example, a first user having a userid of 'user1' issues the query and is authorized to execute f1.b, f1.c, f2.a, and f3.b.

If the compiler resolves the routines in an order that they appear in the query, the algorithm outlined in FIG. 2 would generate the statement and environment entry shown in FIG. 3. This statement would be stored in the dynamic SQL cache.

Despite the duplicate occurrence of f1 in the statement, the information (of resolving to f1.b and not being able to resolve to f1.a) is kept in the cache only once—. This reduces memory usage in the cache and avoids unnecessary comparisons in Part II of the algorithm.

Since the resolved routine list 310 comprises all the resolved routines, these same routines are not placed in the 'required privilege list' (314).

Part II. Cache Comparison and Ordering

The cache lookup begins, as it did in the prior art, with matching the statement text and the 'base environment' settings. Once these are matched, the second part of the algorithm is executed. In this phase, the environment entry is considered a 'routine environment' match by virtue of examining the information in the cache and determining if it suits the user issuing the SQL statement. If the 'routine environment' is deemed not to be a match for the current user, then a new environment entry is created, and ordered either 'before' or 'after' the existing environment entry, depending on the type of mismatch.

Figure 4A:
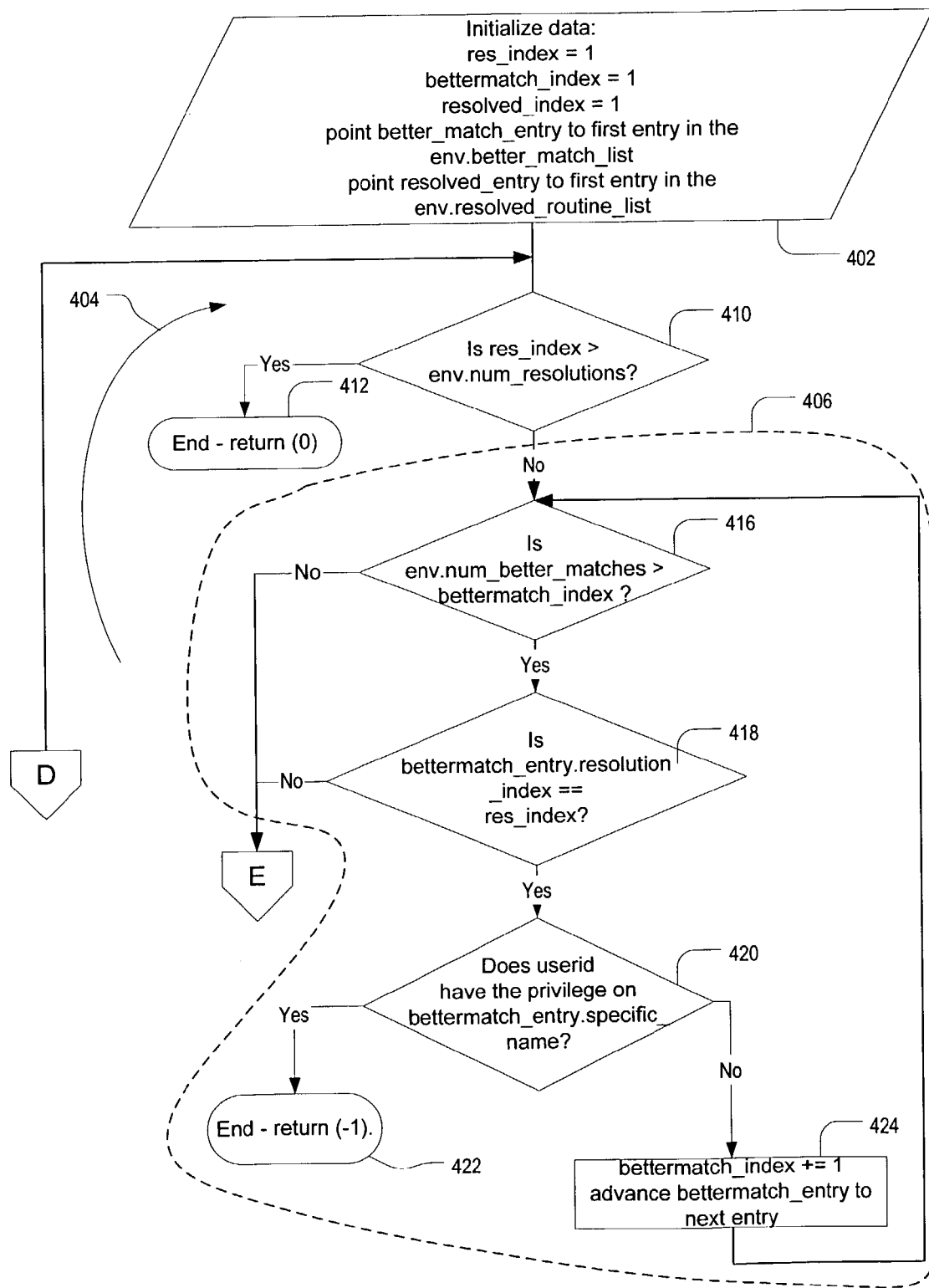
FIG. 4 is comprised of FIGS. 4*a* and 4*b*, and represents a flowchart depicting a method for comparing a specific routine to a routine environment of an SQL cache.
Figure 4B:
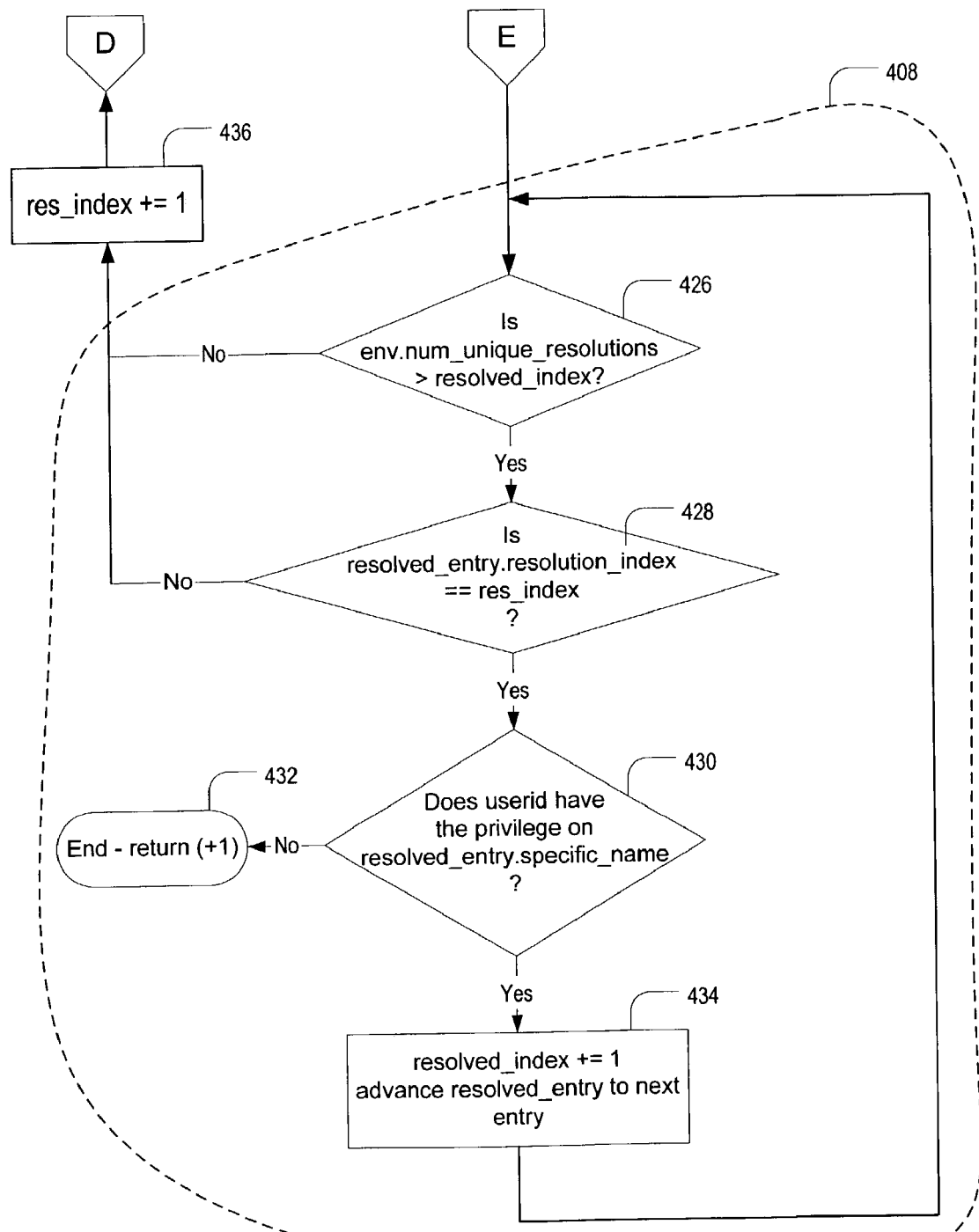

FIG. 4 (FIGS. 4a and 4b) is a flowchart of the algorithm for cache matching of the 'routine environment' that is stored in the environment entry. This algorithm is executed after the statement text is located in the cache and the 'base environment' matches. After initialization (step 402), an outer loop 404 sequentially processes the resolved routines. The 'better match list' 308 is searched for a 'better match' (section of the flowchart at 406). Then the 'resolved routine list 310' is searched for a routine to which the user has privilege (section of the flowchart at 408).

In one embodiment, the algorithm returns one of the following results: '0', which means that the environment matches; '−1' which means that this environment does not match and a new environment entry should be inserted before the existing environment to ensure the statement is compiled again; and '+1' which means that the environment does not match and the algorithm should proceed on to the next environment. If another environment does not exist, then a new environment entry is created and inserted after the current environment to ensure that a new compilation takes place.

In detail, variables are first initialized (step 402):

res_index (index used to track each of the resolutions, up to the number of resolutions 304b stored in the routine environment 306 "env.num_resolutions", in the example described above, its value is incremented from 1 to 4) is set to one;

bettermatch_index (an index that identifies a current entry in the better_match_list 308 of the routine environment 306) is set to one;

resolved_index (an index that identifies a current entry in the resolved_routine_list 310 of the routine environment 306) is set to one;

better_match_entry (a pointer to an entry in the better_match list 308 of the routine environment 306) is set to point to the first entry in the "env.better_match_list"); and resolved_entry (a pointer to an entry in the resolved_routine list 310 of the routine environment 306) is set to point to the first entry in the "env.resolved_routine_list".

After the variables are initialized, res_index is tested to determine if it is greater than env.num_resolutions (step 410). If res_index is greater than env.num_resolutions, the environment matches and '0' is returned (step 412). If res_index is not greater than env.num_resolutions, the better match list 308 (section 406) is searched.

If env.num_better_matches is greater than bettermatch_index (step 416) the better_match_entry.resolution_index is equal to res_index (step 418), and the user has privilege to execute the specific_name in the better_match_entry entry (step 420), then the environment does not match and '−1' is returned (step 422). If env.num_better_matches is greater than bettermatch_index (step 416), better_match_entry.resolution_index is equal to res_index (step 418), and the user does not have privilege to execute the specific_name in the better_match_entry (step 420), then the bettermatch_index is incremented (step 424) and the algorithm returns to step 416 advancing the better_match_entry to the next entry in the better_match_list. If env.num_better_matches is less than or equal to bettermatch_index (step 416) or better_match_entry.resolution_index is not equal to res_index (step 418) then the algorithm searches the resolved routine list 310 (section 408, FIG. 4b).

If env.num_unique_resolutions is greater than resolved index (step 426), resolved_entry.resolution_index is equal to res_index (step 428) but the user does not have privilege to execute the specific_name identified in the resolved_entry (step 430), then the environment does not match and '+1' is returned (step 432). If num_unique_resolutions is greater than res_index (step 426), resolved_entry.resolved_index is equal to res_index (step 428) and the user has privilege to execute the specific_name in the resolved_entry (step 430) then resolved_index is incremented and the resolved_entry pointer is advanced (step 434) to the next entry in the resolved_routine_list. The algorithm then returns to step 426. If either num_unique_resolutions is less than or equal to resolved_index (step 426) or resolved_entry.resolution_index is not equal to res_index (step 428) then res_index is incremented (step 436) and the algorithm returns to step 410 (FIG. 4a).

Incorporating the routine resolution information processing into the overall comparison of the environment ensures that the user does not automatically get a failure if the user is not authorized to execute a particular routine. This is necessary because the user, while not authorized to execute a specific instance of a function, might still be able to resolve to another routine instance having the same name. This is facilitated when a '+1' is returned by the algorithm. In that case, environment comparison continues to another environment, and the next environment might comprise a combination of routines the user is authorized to execute. However, if no environment matches, a new environment will be inserted, allowing the user to compile and determine during compilation whether there are other qualified routine matches that the user is authorized to execute. If no other qualified routine matches are found, a failure indicating a routine is not found or not authorized will be returned by the compilation.

Since the authorizations are checked as part of the environment comparison, the specific routines that are referenced in the access plan 312 need not be added to the 'list of required privileges' that are checked after the environment match has been established. Thus, in FIG. 3, only the table "required priv: select on X.T1" 314 contains a list of required privileges, not the specific routines.

Advantageously, this algorithm provides a deterministic method of establishing whether a new compile is required for the current user.

If the algorithm returns a '0', even if the statement were to have been compiled again the exact same resolution would result. Consequently, there is no need to compile again as is indicated by a correct match.

If the algorithm returns a non-zero value for the existing cached environments, then a new compile is required since a different resolution (or a failure in resolution if the user is not authorized to execute any of the routines) would necessarily result.

This determinism ensures that the cached copy is utilized when appropriate, and not utilized when it would provide an incorrect resolution.

This algorithm provides an efficient and deterministic method of ordering the environments that are created to distinguish between various 'routine environments'. Progressing through the lists of 'resolved routines' and 'best match routines' in conjunction with the positional index of the routine resolution in the statement text, provides a method for sequencing among environments that differ only in their 'routine environment'. Consequently, duplicate entries do not end up in the cache. Furthermore, only the minimum number of environments and the minimum number of authorizations are checked when attempting to find a match in the cache. To illustrate, an example is provided in which a statement comprises routine references:

Statement text="select f1(c1), f2(c2) from X.T1"
The following specific routines that share the same name exist:
  Routine name f1( ): specific names f1.a, f1.b, f1.c; and
  Routine name f2( ): specific names f2.a, f2.b
The ordering of match 'quality' from best to worst:
  For f1(c1) (resolution #1): f1.a is the best match followed by f1.b and f1.c; and
  For f2(c2) (resolution #2): f2.a is the best match followed by f2.b User1 issues the query first and is authorized to execute f1.b, f2.a. User2 is authorized to execute f1.a and f2.b. User3 is authorized to execute all routines. All users execute the same statement with the same 'base environment'.

If user1 compiles first, the routine_environment (environment1) will have one entry in the better_match_list; this entry will have f1.a as the specific_name and a resolution_index of 1, indicating that f1.a is a better match that wasn't authorized in the first resolution processed in the statement during compilation. The routine environment will have 2 entries in the resolved_routine_list; the first entry will have f1.b as the specific_name and a resolution_index of 1, which indicates that f1.b is the resolved-to routine for the first resolution processed in the statement during compilation; the second entry will have f2.a as the specific_name and a resolution_index of 2, which indicates that f2.a is the resolved-to routine for the second resolution.

If user2 issues the query, the algorithm first checks the entries associated with resolution #1. The algorithm then determines that user2 is authorized to execute the better_match f1.a and immediately returns '−1' without bothering to check whether it is authorized to execute f2.a (which user2 isn't). Thus the algorithm prioritizes routine resolutions based on the order in which the routine references are processed during compilation. This ensures that a new environment entry (environment 2) will be inserted before the existing environment and a new compilation will ensue. The new environment will have entries in the better_match_list and the resolved_routine list that indicate that f1.a is the resolved-to routine for the first resolution, f2.a is a better match that wasn't authorized in the second resolution and f2.b is the resolved-to routine in the second resolution.

When user3 issues the same query the algorithm encounters the environment entry inserted on behalf of user2 first (environment2). There is no better_match_entry in this environment for the first resolution and user3 is authorized to execute the f1.a, the resolved to routine for the first resolution. Moving on to the second resolution, user3 is authorized to execute the 'better match' f2.a. The algorithm will thus return '−1', indicating that a new environment entry (environment3) needs to be inserted before the two existing environment entries. There is no need to check the other environment's entry (environment1), because the algorithm dictates that any subsequent environments could not be a match for user3.

The embodiments of the present invention provide a method, a data processing system, a computer program product, and/or an article for compiling, for a user that has been granted execute privileges to selected database access routines, a dynamic structured query language (SQL) statement having overloaded object types. It will be appreciated, by those skilled in the art, that the article can be a signal bearing medium having means for transporting computer readable code to a data processing system over a network, in which the code can be used to implement the method.

It will also be appreciated, by those skilled in the art, that the computer program product comprises a computer readable medium having computer executable code for directing a data processing system to implement the method. The computer program product can also be called a computer-readable memory, in which the memory can be a CD, floppy disk or hard drive or any sort of memory device usable by a data processing system. It will also be appreciated, by those skilled in the art, that a data processing system may be configured to operate the method either by use of computer executable code residing in a medium or by use of dedicated hardware modules, also generally or generically known as mechanisms or means, which may operate in an equivalent manner to the code which is well known in the art.

It is to be understood that the specific embodiments of the invention that have been described are merely illustrative of certain application of the principle of the present invention. Numerous modifications may be made to system and method for caching database query statements invention described herein without departing from the spirit and scope of the present invention.

What is claimed is:

1. A method of directing a database management system to cache a database query statement into a memory cache, the database query statement belonging to a user with a privilege to selected database access routines, the method comprising:
   determining a best available match for each routine object reference in the database query statement, by selecting a matching routine from among the routines, which considered as a match;
   adding the best available match to a list of better match routines if the user does not have privilege the privilege to access the best available match;
   adding the best available match to a list of resolved-to routines if the user has the privilege to access the best available match; and
   storing the list of better match objects and the list of resolved-to objects as part of a data structure in the memory cache.

2. The method as claimed in claim 1, wherein adding the best available match to the list of better match objects comprises:
   searching the list of better match objects for the routine reference; and
   adding an entry corresponding to the routine reference to the list of better match objects if the routine reference is not found in the list of better match objects.

3. The method as claimed in claim 1, wherein adding the best available match to the list of resolved-to routines comprises:
   searching the list of resolved-to routines for the routine reference; and
   adding an entry corresponding to the routine reference to the list of resolved-to routines if the routine reference is not found in the list of resolved-to routines.

4. The method as claimed in claim 1, further comprising eliminating each routine reference selected as a better match from further consideration as a match.

5. The method as claimed in claim 1, further comprising expressing the database query statement in a dynamic structured query language; and
   wherein the database query comprises overloaded object types.

6. The method as claimed in claim 1, further comprising:
   searching the data structure for a previously compiled database query statement having a statement text and a base environment matching the statement text and the base environment being associated with the database query; and
   creating a new environment to ensure that a new compilation of the database query takes place if a match is not found.

7. The method as claimed in claim 6, further comprising, if the matching statement text and matching base environment are found:
   examining information in the data structure to determine whether an associated routine environment is a match for the current user; and
   using the compiled database query statement if there is a match.

8. The method as claimed in claim 7, further comprising, if the user has a privilege to access a better match routine in the routine environment:
   creating a new environment to ensure that a new compilation takes place; and
   setting a predetermined variable to a first value to control a position of a new data structure in the memory cache.

9. The method as claimed in claim 8, further comprising, if the user does not have the privilege to access the better match routine in the routine environment:
   searching the data structures in the memory cache for another matching statement text and another matching base environment;
   reexamining information in the data structure;
   creating a new environment to ensure that a new compilation takes place if another matching base environment is not found; and
   setting the predetermined variable to a second value to control the position of the new data structure in the memory cache.

10. The method as claimed in claim 9, wherein if the matching statement text and the matching base environment are not found and the new compilation is successful, storing the new data structure in the memory cache.

11. The method as claimed in claim 10, wherein if the predetermined variable is set to the first value and the new compilation is successful, storing the new data structure in the memory cache before the data structure with the matching statement text and the matching base environment.

12. The method as claimed in claim 11, wherein if the predetermined variable is set to the second value and the new compilation is successful, storing the new data structure in the memory cache after the data structure with the matching statement text and the matching base environment.

13. A computer program product having a plurality of executable instruction codes that are stored on a computer usable medium for directing a database management system to cache a database query statement into a memory cache, the database query statement belonging to a user with a privilege to selected database access routines, the computer program product comprising:
  a first set of instruction codes for determining a best available match for each routine object reference in the database query statement, by selecting a matching routine from among the routines, which is considered as a match;
  a second set of instruction codes for adding the best available match to a list of better match routines if the user does not have privilege the privilege to access the best available match;
  a third set of instruction codes for adding the best available match to a list of resolved-to routines if the user has the privilege to access the best available match; and
  a fourth set of instruction codes for storing the list of better match objects and the list of resolved-to objects as part of a data structure in the memory cache.

14. The computer program product as claimed in claim 13, wherein the second set of instruction codes comprises:
  instruction codes for searching the list of better match objects for the routine reference; and
  instruction codes for adding an entry corresponding to the routine reference to the list of better match objects if the routine reference is not found in the list of better match objects.

15. The computer program product as claimed in claim 13, wherein the second set of instruction codes comprises:
  instruction codes for searching the list of resolved-to routines for the routine reference; and
  instruction codes for adding an entry corresponding to the routine reference to the list of resolved-to routines if the routine reference is not found in the list of resolved-to routines.

16. The computer program product as claimed in claim 13, further comprising a fifth set of instruction codes for eliminating each routine reference selected as a better match from further consideration as a match.

17. The computer program product as claimed in claim 13, further comprising a sixth set of instruction codes for expressing the database query statement in a dynamic structured query language; and
  wherein the database query comprises overloaded object types.

18. The computer program product as claimed in claim 13, further comprising:
  a seventh set of instruction codes for searching the data structure for a previously compiled database query statement having a statement text and a base environment matching the statement text and the base environment being associated with the database query; and
  an eight set of instruction codes for creating a new environment to ensure that a new compilation of the database query takes place if a match is not found.

19. The computer program product as claimed in claim 18, further comprising, if the matching statement text and matching base environment are found, a ninth set of instruction codes examines information in the data structure to determine whether an associated routine environment is a match for the current user, and uses the compiled database query statement if there is a match.

20. The computer program product as claimed in claim 19, further comprising, if the user has a privilege to access a better match routine in the routine environment, a tenth set of instruction codes creates a new environment to ensure that a new compilation takes place, and sets a predetermined variable to a first value to control a position of a new data structure in the memory cache.

21. The computer program product as claimed in claim 20, further comprising, an eleventh set of instruction codes, which, if the user does not have the privilege to access the better match routine in the routine environment:
  searches the data structures in the memory cache for another matching statement text and another matching base environment;
  reexamines information in the data structure;
  creates a new environment to ensure that a new compilation takes place if another matching base environment is not found; and
  sets the predetermined variable to a second value to control the position of the new data structure in the memory cache.

22. The computer program product as claimed in claim 21, wherein if the matching statement text and the matching base environment are not found and the new compilation is successful, the fourth set of instruction codes stores the new data structure in the memory cache.

23. The computer program product as claimed in claim 22, wherein if the predetermined variable is set to the first value and the new compilation is successful, the fourth set of instruction codes further stores the new data structure in the memory cache before the data structure with the matching statement text and the matching base environment.

24. The computer program product as claimed in claim 23, wherein if the predetermined variable is set to the second value and the new compilation is successful, the fourth set of instruction codes stores the new data structure in the memory cache after the data structure with the matching statement text and the matching base environment.

25. A database management system for caching a database query statement into a memory cache, the database query statement belonging to a user with privilege to selected database access routines, the system comprising:
  means for determining a best available match for each routine object reference in the database query statement, by selecting a matching routine from among the routines, which is considered as a match;
  means for adding the best available match to a list of better match routines if the user does not have privilege the privilege to access the best available match;
  means for adding the best available match to a list of resolved-to routines if the user has the privilege to access the best available match; and
  means for storing the list of better match objects and the list of resolved-to objects as part of a data structure in the memory cache.

26. The system as claimed in claim 25, wherein the means for adding the best available match to the list of better match routines comprises:
  means for searching the list of better match objects for the routine reference; and means for adding an entry corresponding to the routine reference to the list of better match objects if the routine reference is not found in the list of better match objects.

27. The system as claimed in claim 25, wherein the means for adding the best available match to the list of better match routines comprises:
  means for searching the list of resolved-to routines for the routine reference; and means for adding an entry corresponding to the routine reference to the list of resolved-to routines if the routine reference is not found in the list of resolved-to routines.

28. The system as claimed in claim 25, further comprising means for eliminating each routine reference selected as a better match from further consideration as a match.

29. The system as claimed in claim 25, further comprising means for expressing the database query statement in a dynamic structured query language; and
   wherein the database query comprises overloaded object types.

30. The system as claimed in claim 25, further comprising:
   means for searching the data structure for a previously compiled database query statement having a statement text and a base environment matching the statement text and the base environment being associated with the database query; and
   means for creating a new environment to ensure that a new compilation of the database query takes place if a match is not found.

31. The system as claimed in claim 30, further comprising, if the matching statement text and matching base environment are found, means for examining information in the data structure to determine whether an associated routine environment is a match for the current user, and for using the compiled database query statement if there is a match.

32. The system as claimed in claim 31, further comprising, if the user has a privilege to access a better match routine in the routine environment, means for creating a new environment to ensure that a new compilation takes place, and for setting a predetermined variable to a first value to control a position of a new data structure in the memory cache.

33. The system as claimed in claim 32, wherein if the user does not have the privilege to access the better match routine in the routine environment, further comprising:
   means for searching the data structures in the memory cache for another matching statement text and another matching base environment;
   means for reexamining information in the data structure;
   means for creating a new environment to ensure that a new compilation takes place if another matching base environment is not found; and
   means for setting the predetermined variable to a second value to control the position of the new data structure in the memory cache.

34. The system as claimed in claim 33, wherein if the matching statement text and the matching base environment are not found and the new compilation is successful, the storing means stores the new data structure in the memory cache.

35. The system as claimed in claim 34, wherein if the predetermined variable is set to the first value and the new compilation is successful, the storing means further stores the new data structure in the memory cache before the data structure with the matching statement text and the matching base environment.

36. The system as claimed in claim 35, wherein if the predetermined variable is set to the second value and the new compilation is successful, the storing means further stores the new data structure in the memory cache after the data structure with the matching statement text and the matching base environment.

* * * * *